(12) United States Patent
Franklin et al.

(10) Patent No.: US 7,670,707 B2
(45) Date of Patent: Mar. 2, 2010

(54) ELECTRICAL CONTACTS FOR FUEL CELLS

(75) Inventors: Jerrold E. Franklin, Sacramento, CA (US); Eric S. Mettler, Cameron Park, CA (US)

(73) Assignee: Altergy Systems, Inc., Folsom, CA (US)

( * ) Notice: Subject to any disclaimer, the term of this patent is extended or adjusted under 35 U.S.C. 154(b) by 1590 days.

(21) Appl. No.: 10/630,156

(22) Filed: Jul. 30, 2003

(65) Prior Publication Data

US 2005/0026020 A1    Feb. 3, 2005

(51) Int. Cl.
*H01M 8/02* (2006.01)
(52) U.S. Cl. .......................................... 429/34; 429/36
(58) Field of Classification Search ................. 429/26, 429/32, 34, 38, 39
See application file for complete search history.

(56) References Cited

U.S. PATENT DOCUMENTS

| | | | |
|---|---|---|---|
| 4,212,929 A | 7/1980 | Grevstad et al. |
| 4,445,994 A | 5/1984 | Divisek et al. |
| 4,467,019 A | 8/1984 | Feigenbaum |
| 4,503,132 A | 3/1985 | Struthers |
| 4,505,992 A | 3/1985 | Dettling |
| 4,514,475 A | 4/1985 | Mientek |
| 4,548,675 A | 10/1985 | Gordy et al. |
| 4,581,114 A | 4/1986 | Morris et al. |
| 4,588,661 A | 5/1986 | Kaufman |
| 4,609,595 A | 9/1986 | Nickols |
| 4,614,692 A | 9/1986 | Kajiyama |
| 4,737,421 A | 4/1988 | Uemura et al. |
| 4,743,519 A | 5/1988 | Kaji et al. |
| 4,761,349 A | 8/1988 | McPheeters |
| 4,767,519 A | 8/1988 | de Nora |
| 4,818,640 A | 4/1989 | Fukuda et al. |
| 4,855,193 A | 8/1989 | McElroy |
| 5,084,364 A | 1/1992 | Quaadvliet |
| 5,176,966 A | 1/1993 | Epp et al. |
| 5,200,278 A | 4/1993 | Watkins et al. |
| 5,270,131 A | 12/1993 | Diethelm et al. |
| 5,299,939 A | 4/1994 | Walker et al. |
| 5,328,779 A | 7/1994 | Tannenberger et al. |
| 5,338,621 A | 8/1994 | Bossel |
| 5,470,671 A | 11/1995 | Fletcher et al. |

(Continued)

FOREIGN PATENT DOCUMENTS

CA        2015782 A1    10/1991

(Continued)

OTHER PUBLICATIONS

Merriam-Webster's Collegiate Dictionary, Tenth Addition, Published 1998.*

*Primary Examiner*—Patrick Ryan
*Assistant Examiner*—Monique Wills
(74) *Attorney, Agent, or Firm*—John P. O'Banion

(57) ABSTRACT

A laminar electrical contact for fuel cells is disclosed. By optimizing the contact area and pressure between a separator plate and a membrane electrode assembly, the lamina of the present invention improves fuel cell efficiency and performance. The lamina may rest upon compliant members or springs that push the lamina into the adjoining membrane electrode assembly, thereby assuring continuous and robust electrical contact between the separator plate and the membrane electrode assembly.

18 Claims, 8 Drawing Sheets

U.S. PATENT DOCUMENTS

| | | | |
|---|---|---|---|
| 5,484,514 A | 1/1996 | Katayama | |
| 5,514,487 A | 5/1996 | Washington et al. | |
| 5,683,828 A | 11/1997 | Spear et al. | |
| 5,698,337 A | 12/1997 | Nitschke et al. | |
| 5,773,161 A | 6/1998 | Farooque et al. | |
| 5,800,152 A | 9/1998 | Taimatu | |
| 5,858,567 A | 1/1999 | Spear, Jr. et al. | |
| 5,863,671 A | 1/1999 | Spear, Jr. et al. | |
| 5,945,232 A | 8/1999 | Ernst et al. | |
| 5,976,727 A | 11/1999 | Mercuri et al. | |
| 6,020,083 A | 2/2000 | Fuglevand et al. | |
| 6,030,718 A | 2/2000 | Fuglevand et al. | |
| 6,051,331 A | 4/2000 | Spear, Jr. et al. | |
| 6,057,054 A | 5/2000 | Barton et al. | |
| 6,059,943 A | 5/2000 | Murphy et al. | |
| 6,060,189 A | 5/2000 | Mercuri et al. | |
| 6,066,409 A | 5/2000 | Ronne et al. | |
| 6,080,502 A | 6/2000 | Nolscher | |
| 6,080,503 A | 6/2000 | Schmid et al. | |
| 6,087,033 A | 7/2000 | Grune et al. | |
| 6,132,895 A | 10/2000 | Pratt et al. | |
| 6,159,628 A | 12/2000 | Grasso et al. | |
| 6,165,634 A | 12/2000 | Krasij et al. | |
| 6,190,793 B1 | 2/2001 | Barton et al. | |
| 6,207,310 B1 | 3/2001 | Wilson et al. | |
| 6,214,486 B1 | 4/2001 | Okamoto | |
| 6,218,035 B1 | 4/2001 | Fuglevand | |
| 6,224,396 B1 | 5/2001 | Chan et al. | |
| 6,322,919 B1 | 11/2001 | Yang et al. | |
| 6,338,492 B1 | 1/2002 | Schilling et al. | |
| 6,358,642 B1 | 3/2002 | Griffith et al. | |
| 6,372,374 B1 | 4/2002 | Li et al. | |
| 6,379,795 B1 | 4/2002 | Bisaria et al. | |
| 6,410,179 B1 | 6/2002 | Boyer | |
| 6,468,682 B1 * | 10/2002 | Fuglevand et al. | 429/26 |
| 6,531,238 B1 | 3/2003 | King | |
| 6,815,113 B2 | 11/2004 | Franklin et al. | |
| 2002/0022170 A1 | 2/2002 | Franklin et al. | |
| 2002/0022382 A1 * | 2/2002 | Franklin et al. | 439/66 |
| 2002/0065000 A1 | 5/2002 | Morozumi | |
| 2003/0064612 A1 | 4/2003 | England | |
| 2003/0075311 A1 | 4/2003 | Seaba | |
| 2003/0104263 A1 | 6/2003 | Molter et al. | |
| 2008/0070081 A1 | 3/2008 | Franklin et al. | |

FOREIGN PATENT DOCUMENTS

| | | |
|---|---|---|
| DE | 4307727 A1 | 9/1994 |
| DE | 19523317 A1 | 11/1996 |
| DE | 19624887 A1 | 1/1997 |
| EP | 0604683 A1 | 7/1994 |
| GB | 2323700 A | 9/1998 |
| GB | 2326017 A | 12/1998 |
| GB | 2348047 A | 9/2000 |
| JP | 60086012 A | 5/1985 |
| JP | 3049160 A | 3/1991 |
| WO | 0219451 A2 | 3/2002 |
| WO | 0219451 A3 | 3/2002 |

* cited by examiner

FIG._1
(PRIOR ART)

ELECTRICAL CONTACTS FOR FUEL CELLS

BACKGROUND OF THE INVENTION

A. Field of the Invention

This invention relates to fuel cells.

B. Description of the Related Art

Fuel cells are energy conversion devices that use hydrogen as a fuel and oxygen as an oxidant to generate electricity without combustion and without harmful emissions. The voltage and current output of a fuel cell system depends on the number of cells in the stack, total active surface area, and efficiency. The basic process, for a single cell, is shown in FIG. 1.

Traditional fuel cell stacks are made of many individual cells 10 which are stacked together. See FIGS. 2, 3 & 4. Such fuel cells typically have a bipolar separator plate (BSP) 12 typically made of machined graphite, a membrane electrode assembly (MEA) 14, gaskets 16, 18, a fuel manifold 24, and may have oxidizer and a coolant manifolds. See FIGS. 3 and 4.

For the proper operation of fuel cells, the hydrogen gas must be sealed inside the cell and separated from the gaseous oxidant (air or oxygen). In some fuel cells, cooling is required because of the heat generated during normal operation. This heat is commonly removed from the fuel cell stacks by liquid cooling, commonly using water as a coolant.

Additionally, it is critical that the BSP 12 be in intimate, continuous electrical contact with the MEA 14.

As shown in FIGS. 2 & 4, fuel cell stacks have typically used a "filter-press" structure, where thick and heavy "end plates" 32, 34 are placed at the ends of each fuel cell stack 10 and are held together by heavy tie-rods, or bolts 38 and nuts 40, or other fasteners.

The "filter press" structure is an attempt to serve two purposes: (i) sealing the hydrogen, the oxidant, and the liquid coolant, if used, and (ii) maintaining intimate electrical contact between the BSPs 12 and the MEAs 14. see FIGS. 2 and 4. Disassembly and analysis of fuel cell stacks built by traditional methods reveals that the "filter press" arrangement performs neither function very well. Such analysis has revealed evidence of incomplete electrical contact between BSPs 12 and MEAs 14, resulting in poor electrical conduction and lower cell performance. The analysis has also shown evidence of gas and liquid leakage.

To address the difficulty in maintaining electrical connection, the inventors of the present patent have developed a system of independently acting electrical contacts that robustly maintain contact between the BSP and MEA. These contacts are described in U.S. application Ser. No. 10/068,154. That patent application is incorporated herein by reference as if set out in full.

As explained below, the present invention is a further improvement that allows even better electrical connection between the BSP and the MEA.

SUMMARY OF THE INVENTION

The present invention concerns a single laminar electrical contact or an array of independently-acting laminar electrical contacts within a fuel cell stack. This invention improves fuel cell operation by providing substantially uniform internal load distribution to apply a uniform electrical contact across the MEA.

In one embodiment of the invention, the electrical contact is a lamina which is pressed against an adjacent fuel cell electrode by means of compliant electrical contacts, which can take a number of forms. The compliant electrical contacts can be connected to a conducting base plate or BSP and the lamina in a number of ways, including electrical, mechanical or metallurgical connections, or combinations thereof.

The laminar contacts can be arranged in a regular pattern, providing substantially uniform distance between contact surfaces, or they can be arranged in an irregular pattern, providing a nonuniform distance between contact surfaces. The contacts can be made of many conducting substances, including but not limited to alloys of iron, copper, gold, silver, platinum, aluminum, nickel, chromium, and combinations thereof.

BRIEF DESCRIPTION OF THE DRAWINGS

FIG. 5b is a reverse perspective view of the single unitized bipolar separator plate shown in FIG. 5a.

FIG. 6 is an enlarged perspective view of the single unitized bipolar separator plate depicted in FIG. 5a.

DETAILED DESCRIPTION

The present invention is a laminar electrical contact for use in fuel cells. The purpose of the laminar electrical contact is to optimize the area of contact between the BSP or other electrical contact and the MEA. By optimizing the contact area, overall fuel cell performance and efficiency is improved.

The laminar contact of the present invention can be used with many different kinds of fuel cells. For instance, the present invention can be used with proton exchange membrane fuel cells (PEMFC), alkaline fuel cells (AFC) or phosphoric acid fuel cells (PAFC). For purposes of this patent, "lamina" refers to any thin plate, sheet, or layer for improving electrical contact between cells of a fuel cell stack.

This patent describes one particular embodiment of the present invention, using an integrated and modular fuel cell similar to the fuel cell described in the U.S. patent application with Ser. No. 09/834,389. That patent application is incorporated herein as if set out in full.

In the fuel cell module 50 embodiment described herein, a thin metal BSP 52 is used instead of a traditional graphite BSP. See FIGS. 5a, 5b, 6, & 7. Although the present invention can be used with traditional BSPs, more typically the present invention would be used with thin metal plate BSPs as in the present embodiment.

Figure 1:
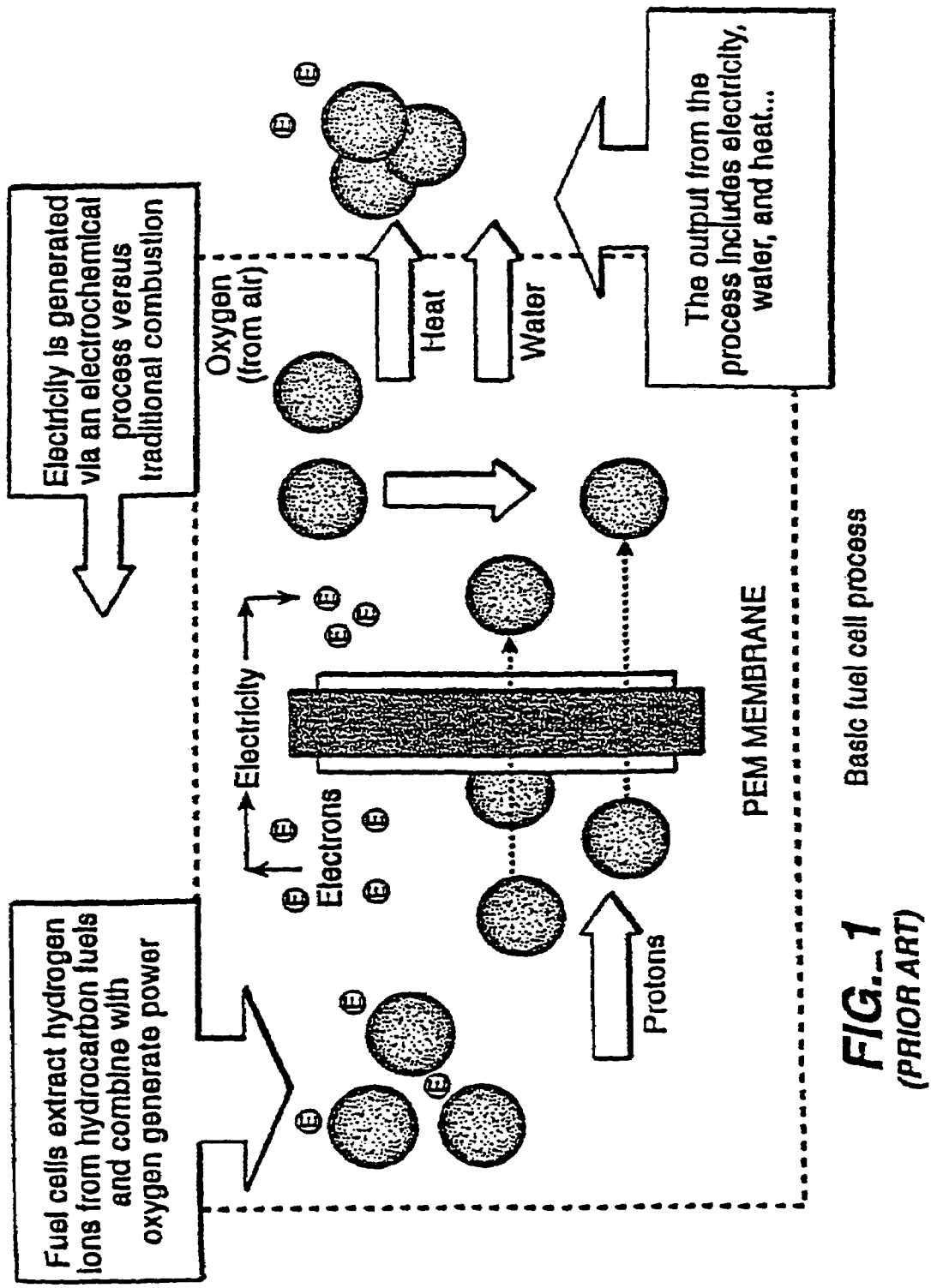
FIG. 1 is a schematic representation of the basic conventional fuel cell process.
Figure 2:
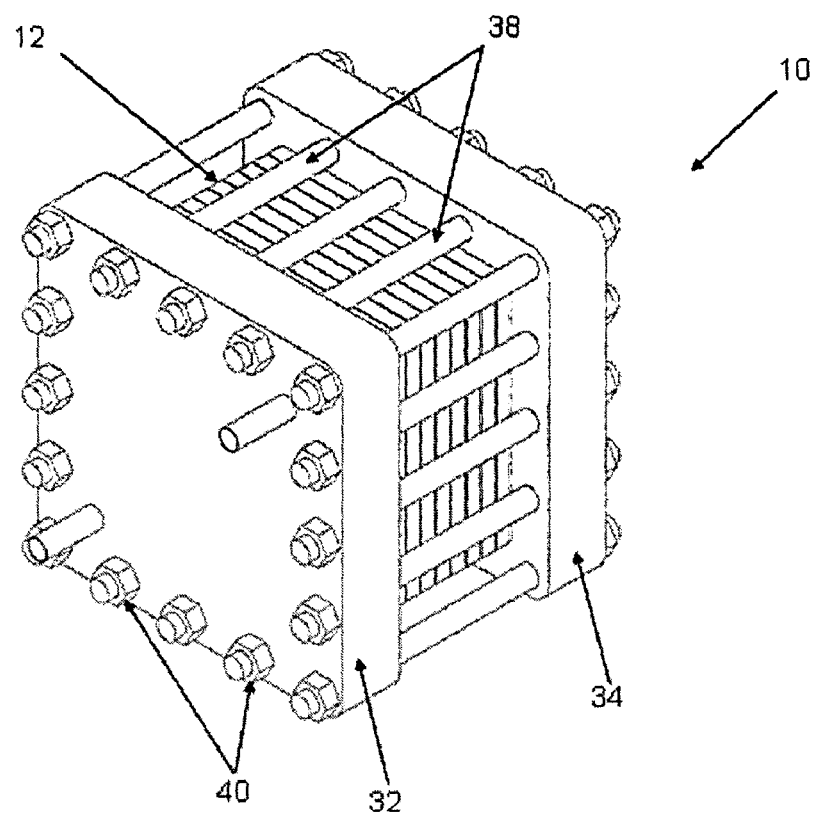
FIG. 2 is a perspective view of a conventional PEM fuel cell stack.
Figure 3:
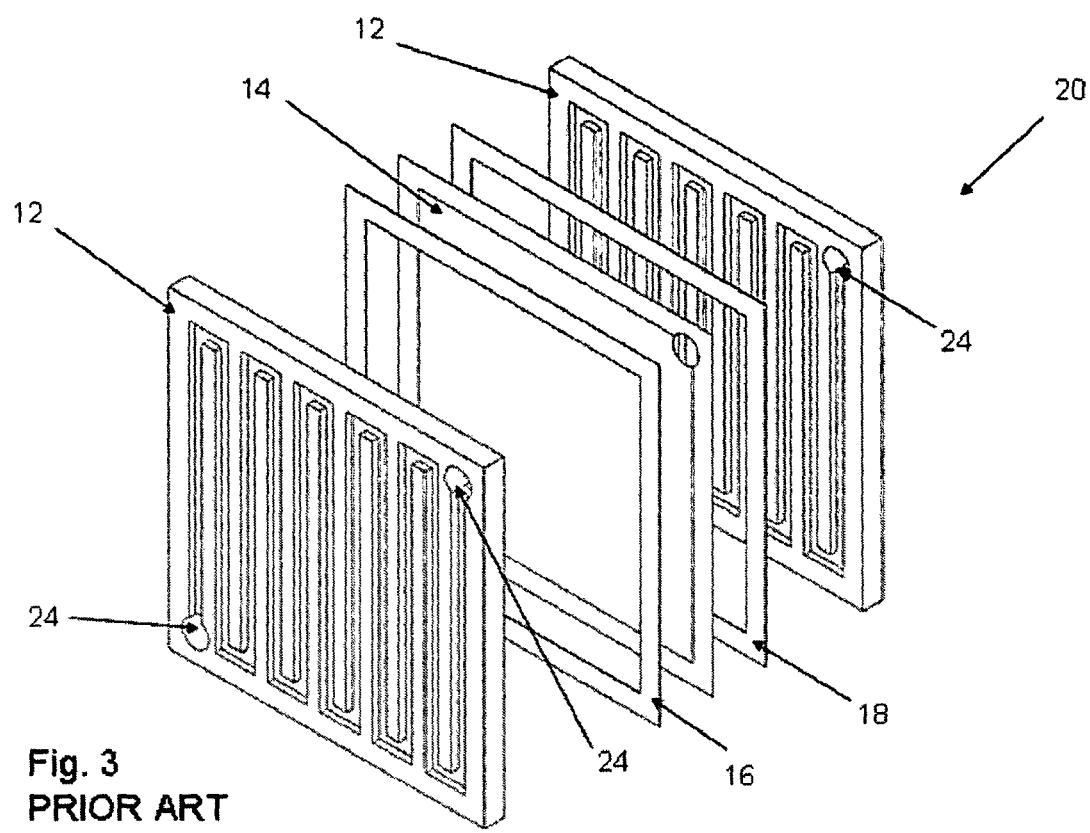
FIG. 3 is an exploded perspective view of a single conventional PEM fuel cell.
Figure 4:
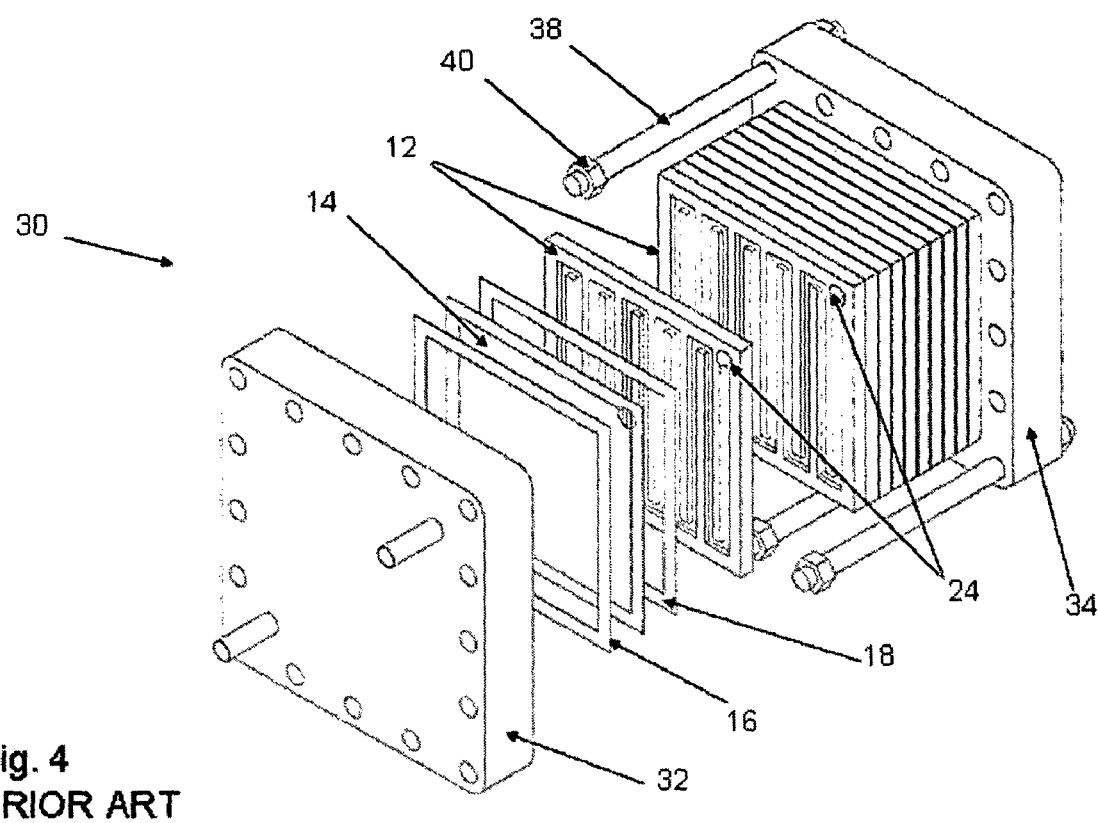
FIG. 4 is an exploded perspective view of a conventional PEM fuel cell stack.
Figure 5A:
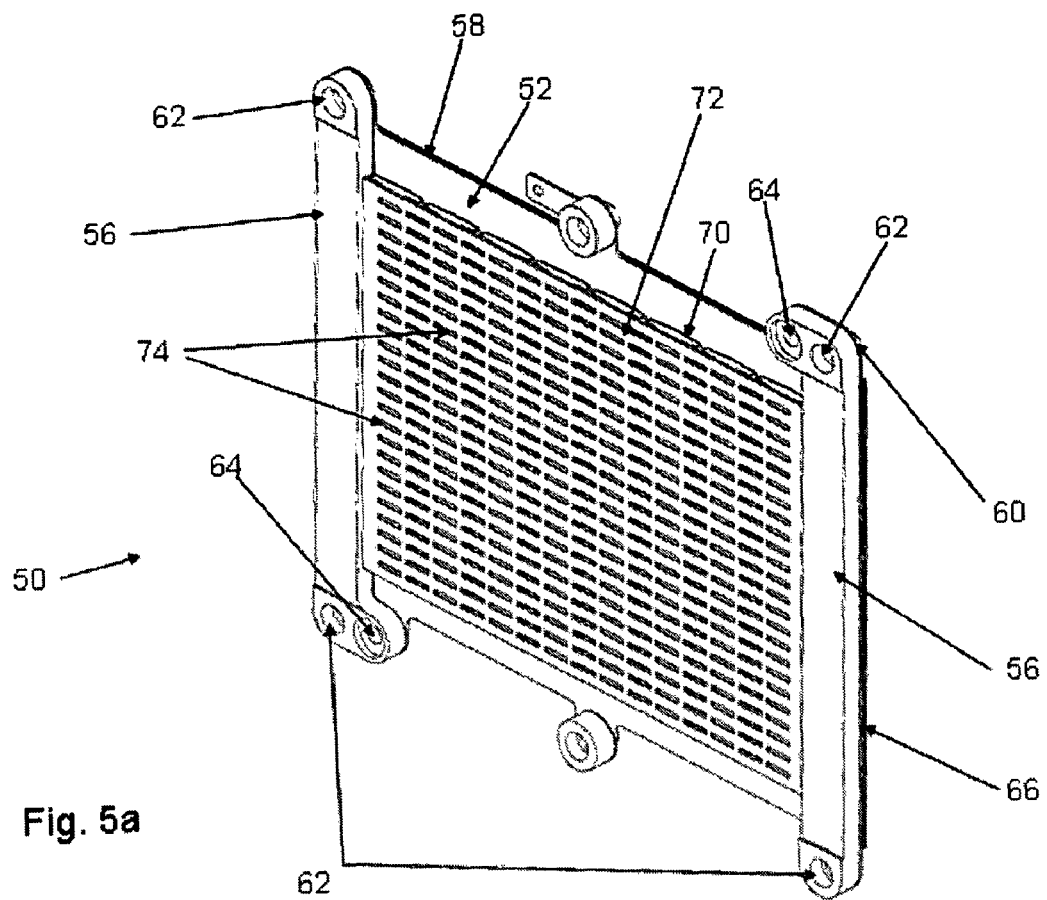
FIG. 5a is a perspective view of a single unitized bipolar separator plate showing the laminar electrode contact according to an embodiment of the present invention.
Figure 5B:
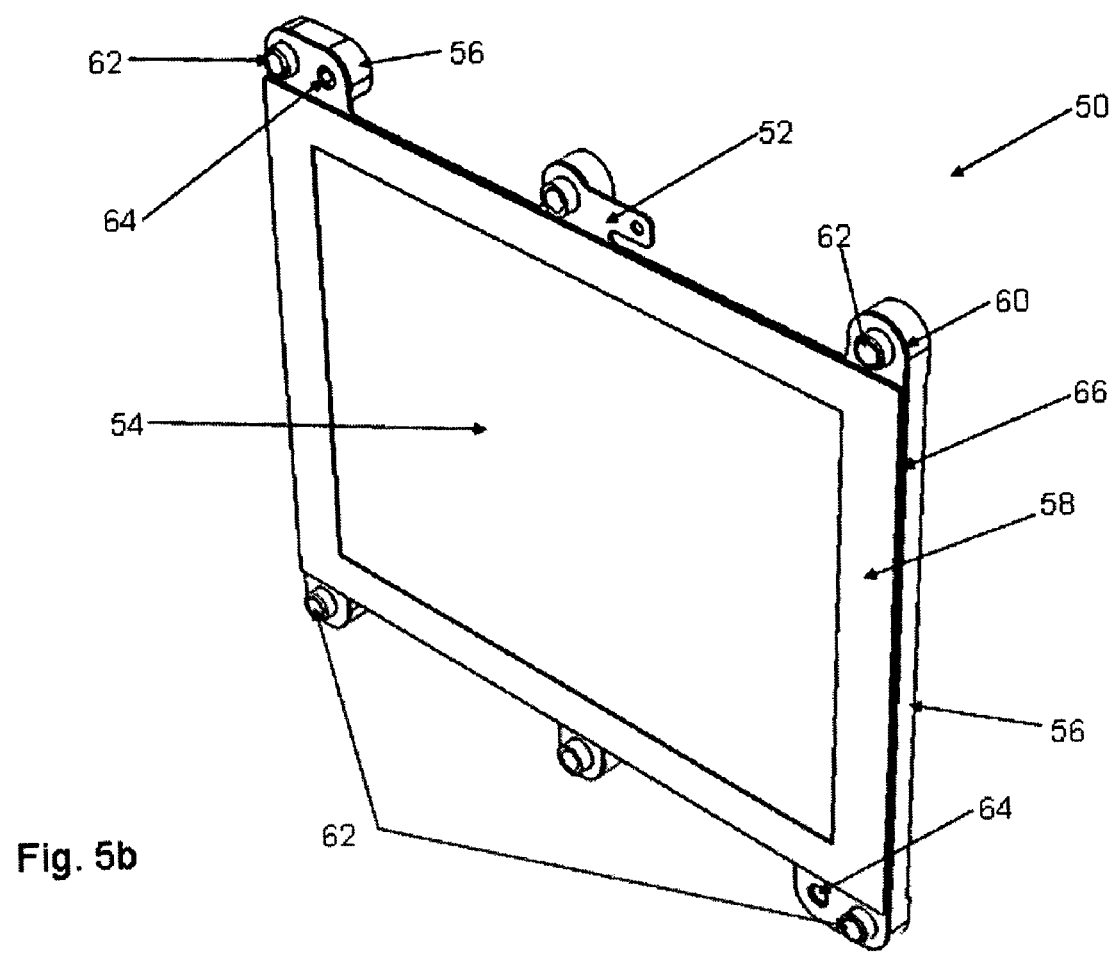
Figure 6:
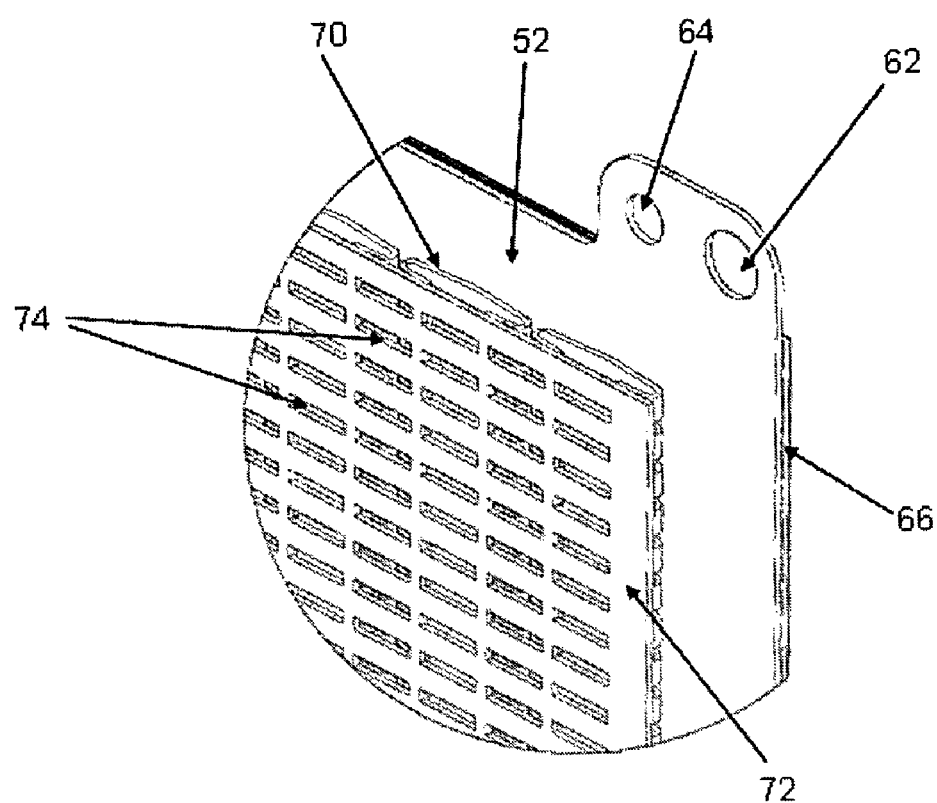
Figure 7:
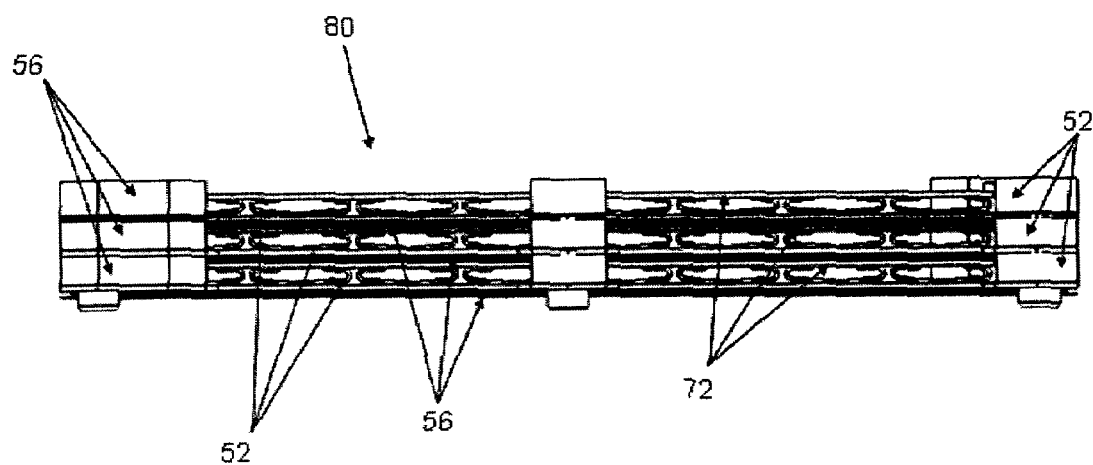
FIG. 7 is a top view of a stack of unitized bipolar separator plates according to an embodiment of the present invention showing the lamina of each cell in contact with the MEA of the adjacent cell.

As shown in FIGS. 5a, 5b, 6, & 7, the fuel cell module 50 of this embodiment has a single thin metal plate BSP 52, onto which the MEA 54 and reactant manifold 56 are assembled into modular units 50 prior to being incorporated into complete fuel cell units (stacks) 80. See FIGS. 5a, 5b and 7. In such a stack 80, as shown in FIG. 7, the BSPs 52 may contain a reactant flow pattern, and the MEAs 54 may or may not have an incorporated diffusion layer, as well as separate diffusion layers if needed.

The modules 50 also may have an adhesive or an adhesive backed gasket or seal 58 and manifold seals or adhesives 60. See FIGS. 5a and 5b. Other features depicted in the figures include tie rod holes 62, reactant passageway 64, and edge seal 66.

Additionally, the embodiment depicted in FIGS. 5 through 7 has compliant members 70 and the lamina 72 for maintaining electrical contact between the BSP 52 and the MEA 54. In the embodiment shown, the compliant members 70 are springs. An array of these compliant members 70 are attached to each BSP 52. See FIGS. 5a, 6, and 7.

As shown in FIGS. 5a, 6, and 7, the lamina 72 is attached to the array of compliant members 70, distal from the BSP 52. The compliant members 70 press the lamina 72 into intimate contact with the adjoining MEA 54, thereby assuring continuous electrical contact with the adjacent BSP 52, as depicted in FIG. 7. Because of the compliant members 70 and the lamina 72, fuel cell stacks made according to the present invention do not require the heavy end plates and tie rods, and the massive compressive forces required in traditional fuel cell stacks.

The lamina 72 may have apertures 74 to facilitate gas flow in the fuel cell module. See FIGS. 5a and 6. These apertures can be a variety of sizes and shapes, ranging from small holes to large slots many inches long. With these apertures, the lamina 72 not only improves electrical contact as described above, but also beneficially increases the turbulence of the cathode air as it flows over the surface.

The laminar electrical contacts approach of the present invention is not limited by the size or shape of the application. The lamina is usually between 0.005" and 0.100" high. The forces (e.g. contact pressure) on the lamina within the cell are usually between about 10 and 1000 pounds per square inch, depending on the configuration as described herein. The lamina may be as small as ¼"×¼" (for very small, light, portable devices such as video cameras, movie cameras, etc.) to the large sizes required for homes, businesses, large buildings, or even small cities.

The lamina 72 of the present invention may take the form of a single plate, as shown in FIGS. 5a, 6, and 7, or the lamina may be an array of independently acting laminae, each of which is attached to a subset of the array of the compliant members.

A variety of materials may be used for such laminar electrical contacts. Stainless steel or stainless steel with gold plate are obvious choices due to its resistance to the high humidity atmosphere associated with fuel cell operation and its corrosion resistance. The lamina 72 may be of other material familiar to those skilled in the art.

A preferred method of fabrication is to etch or stamp the metal-conducting lamina 72. The lamina 72 may be formed by other methods familiar to those skilled in the art. The lamina 72 then may be attached to the compliant members 70 by welding, brazing or soldering or via pre-applied solder paste and soldered using conventional electronic circuit board manufacturing equipment and techniques or may be solely in mechanical and electrical contact. The compliant members 70 may be attached to the BSP 52 by welding, brazing or soldering or via pre-applied solder paste and soldered using conventional electronic circuit board manufacturing equipment and techniques or may be solely in mechanical and electrical contact.

While only a few embodiments of the present invention have been shown and described herein, it will become apparent to those skilled in the art that various modifications and changes can be made in the compliant electrical contacts with lamina to provide long-term substantially uniform or nonuniform spacing between electrodes and consistent electrical contact of electrodes in a fully functioning fuel cell device without departing from the spirit and scope of the present invention. Furthermore, the dimensions, materials and processes recited herein are for purposes of illustration, and are not meant to exclude the use of other dimensions, materials or processes.

We claim:

1. A fuel cell assembly comprising:
   a bipolar separator plate having a first side and a second side;
   a membrane electrode assembly attached to said first side;
   independently-acting compliant members attached to said second side; and
   a conductive laminar electrical contact attached to said independently acting compliant members;
   wherein said independently-acting compliant members are attached to and located between said bipolar separator plate and said conductive laminar electrical contact.

2. The fuel cell assembly according to claim 1, additionally comprising apertures in said conductive laminar electrical contact;
   wherein said apertures facilitate gas flow through the assembly.

3. The fuel cell assembly according to claim 2, additionally comprising a second conductive laminar electrical contact attached to a subset of said independently acting compliant members.

4. The fuel cell assembly according to claim 3, additionally comprising a third laminar electrical contact attached to a subset of said independently acting compliant members.

5. The fuel cell assembly according to claim 2 wherein said independently acting compliant members comprise springs.

6. The fuel cell assembly according to claim 5,
   wherein said laminar electrical contacts are formed into an array having a length,
   wherein said membrane electrode assembly has a length, and
   wherein said length of said array is approximately equal to said length of said membrane electrode assembly.

7. The fuel cell assembly according to claim 5
   wherein said laminar electrical contacts are formed into an array having a width,
   wherein said membrane electrode assembly has a width, and
   wherein said width of said array is approximately equal to said width of said membrane electrode assembly.

8. The fuel cell assembly according to claim 6
   wherein said laminar electrical contacts are formed into an array having a width,
   wherein said membrane electrode assembly has a width, and
   wherein said width of said array is approximately equal to said width of said membrane electrode assembly.

9. A fuel cell stack comprised of
   a first assembly according to claim 1 and
   a second assembly according to claim 1, wherein the laminar electrical contact of said first assembly is in electrical contact with the membrane electrode assembly of said second assembly.

10. A method for maintaining electrical contact between a bipolar separator plate and a membrane electrode assembly in a fuel cell stack comprising placing independently acting compliant members and a laminar electrical contact between said bipolar separator plate and said membrane electrode assembly;
 wherein said independently acting compliant members are attached to and located between said bipolar separator plate and said laminar electrical contact.

11. A fuel cell module comprising:
 a bipolar separator plate with a first side and a second side;
 a membrane electrode assembly attached to said first side;
 flexible means for making electrical contact attached to said second side; and
 a laminar electrical contact attached to said flexible means;
 wherein said flexible means for making electrical contact are attached to and located between said bipolar separator plate and said laminar electrical contact.

12. The fuel cell module according to claim 11, additionally comprising a second laminar electrical contact attached to a subset of said flexible means.

13. The fuel cell module according to claim 12, additionally comprising a third laminar electrical contact attached to a subset of said flexible means.

14. The fuel cell module according to claim 11, additionally comprising apertures in said laminar electrical contacts;
 wherein said apertures facilitates gas flow through the module.

15. A fuel cell stack comprised of
 a first module according to claim 11, and
 a second module according to claim 11,
 wherein the laminar electrical contact of said first module is pressed by said flexible means into electrical contact with the membrane electrode assembly of said second module.

16. A fuel cell stack comprised of
 a first module according to claim 12, and
 a second module according to claim 12,
 wherein the laminar electrical contacts of said first module are pressed by said flexible means into electrical contact with the membrane electrode assembly of said second module.

17. A fuel cell stack comprised of
 a first module, comprising:
  a bipolar separator plate with a first side and a second side;
  a membrane electrode assembly attached to said first side;
  flexible means for making electrical contact attached to said second side;
  a laminar electrical contact attached to said flexible means;
  a second laminar electrical contact attached to a subset of said flexible means; and
  a third laminar electrical contact attached to a subset of said flexible means;
  wherein said flexible means for making electrical contact are located between said bipolar separator plate and said laminar electrical contacts; and
 a second module, comprising:
  a bipolar separator plate with a first side and a second side;
  a membrane electrode assembly attached to said first side;
  flexible means for making electrical contact attached to said second side;
  a laminar electrical contact attached to said flexible means;
  wherein said laminar electrical contact comprises apertures;
  wherein said flexible means for making electrical contact are located between said bipolar separator plate and said laminar electrical contact;
 wherein the laminar electrical contacts of said first module are pressed by said flexible means into electrical contact with the membrane electrode assembly of said second module.

18. A fuel cell stack comprised of
 a first module according to claim 14, and
 a second module according to claim 14,
 wherein the laminar electrical contact of said first module is pressed by said flexible means into electrical contact with the membrane electrode assembly of said second module.

* * * * *